United States Patent
Schmidt et al.

(10) Patent No.: US 9,481,519 B2
(45) Date of Patent: Nov. 1, 2016

(54) HYDRAULIC GEOFRACTURE ENERGY STORAGE SYSTEM WITH DESALINIZATION

(71) Applicant: Quidnet Energy Inc., Healdsburg, CA (US)

(72) Inventors: Howard K. Schmidt, Cypress, TX (US); Aaron H. Mandell, Healdsburg, CA (US)

(73) Assignee: Quidnet Energy Inc., Healdsburg, CA (US)

( * ) Notice: Subject to any disclaimer, the term of this patent is extended or adjusted under 35 U.S.C. 154(b) by 305 days.

(21) Appl. No.: 14/318,742

(22) Filed: Jun. 30, 2014

(65) Prior Publication Data

US 2015/0027952 A1  Jan. 29, 2015

Related U.S. Application Data

(63) Continuation-in-part of application No. 12/853,066, filed on Aug. 9, 2010, now Pat. No. 8,763,387.

(60) Provisional application No. 61/232,625, filed on Aug. 10, 2009.

(51) Int. Cl.
*B65G 5/00* (2006.01)
*C02F 1/44* (2006.01)
*H02K 7/18* (2006.01)
(Continued)

(52) U.S. Cl.
CPC ............... *B65G 5/00* (2013.01); *C02F 1/441* (2013.01); *F03B 13/06* (2013.01); *F03D 9/17* (2016.05); *H02K 7/1807* (2013.01); *C02F 2103/06* (2013.01); *C02F 2307/00* (2013.01); *F05D 2300/607* (2013.01); *Y02E 10/22* (2013.01); *Y02E 10/72* (2013.01); *Y02E 60/15* (2013.01); *Y02E 60/17* (2013.01)

(58) Field of Classification Search
CPC ................................ B65G 5/00; Y02E 60/15
USPC ................. 60/398; 166/280.1, 281, 283, 295
See application file for complete search history.

(56) References Cited

U.S. PATENT DOCUMENTS 2,454,058 A  11/1948  Hays
3,523,192 A   8/1970  Lang
(Continued)

FOREIGN PATENT DOCUMENTS

GB  2256886    12/1992
WO  0227139     4/2002
(Continued)

OTHER PUBLICATIONS

Australia Patent Examination Report No. 1 for Application No. 2010282584 dated Feb. 5, 2015.
(Continued)

*Primary Examiner* — Thomas E Lazo
(74) *Attorney, Agent, or Firm* — Tumey L.L.P.

(57) ABSTRACT

Energy is stored by injecting fluid into a hydraulic fracture in the earth and producing the fluid back while recovering power and/or desalinating water. The method is particularly adapted to storage of large amounts of energy such as in grid-scale electric energy systems. The hydraulic fracture may be formed and treated with resin so as to limit fluid loss and to increase propagation pressure. The fluid may be water containing a dissolved salt or fresh water and a portion or all of the water may be desalinated using pressure in the water when it is produced.

6 Claims, 6 Drawing Sheets

(51) Int. Cl.
*F03B 13/06* (2006.01)
*C02F 103/06* (2006.01)

(56) References Cited

U.S. PATENT DOCUMENTS

| | | | |
|---|---|---|---|
| 3,538,340 A | 11/1970 | Lang | |
| 3,701,383 A | 10/1972 | Richardson et al. | |
| 3,850,247 A | 11/1974 | Tinsley | |
| 3,867,986 A * | 2/1975 | Copeland | C09K 8/5086 166/276 |
| 3,948,325 A | 4/1976 | Winston et al. | |
| 3,996,741 A | 12/1976 | Herberg | |
| 4,182,128 A | 1/1980 | Gardner | |
| 4,421,167 A | 12/1983 | Erbstoesser et al. | |
| 4,691,524 A | 9/1987 | Holscher | |
| 4,776,171 A | 10/1988 | Perry, Jr. et al. | |
| 5,165,235 A | 11/1992 | Nitschke | |
| 5,263,322 A | 11/1993 | Molini | |
| 5,515,679 A | 5/1996 | Shulman | |
| 5,685,155 A | 11/1997 | Brown et al. | |
| 6,776,236 B1 | 8/2004 | Nguyen | |
| 7,213,651 B2 | 5/2007 | Brannon et al. | |
| 7,254,944 B1 * | 8/2007 | Goetzinger | F02C 6/16 290/55 |
| 7,281,371 B1 | 10/2007 | Heidenreich | |
| 8,082,994 B2 | 12/2011 | Nguyen et al. | |
| 2005/0257929 A1 | 11/2005 | Nguyen et al. | |
| 2005/0274523 A1 | 12/2005 | Brannon et al. | |
| 2007/0007009 A1 | 1/2007 | Nguyen | |
| 2007/0223999 A1 | 9/2007 | Curlett | |
| 2010/0183903 A1 | 7/2010 | McGinnis et al. | |
| 2011/0030362 A1 | 2/2011 | Schmidt | |
| 2013/0062890 A1 | 3/2013 | Saar et al. | |
| 2014/0174080 A1 | 6/2014 | Friesth | |

FOREIGN PATENT DOCUMENTS

| | | |
|---|---|---|
| WO | 2004/035987 | 4/2004 |
| WO | 2014/028832 A1 | 2/2014 |

OTHER PUBLICATIONS

International Search Report and the Written Opinion of International Application No. PCT/US2015/038363 dated Oct. 8, 2015.
SPE 64980 "Water-Dispersible Resin System for Welbore Stabilization" Society of Petroleum Engineers, 2001.
"Widths of Hydraulic Fractures." The Atlantic Refining Company Dallas, Texas, Sep. 1961.

* cited by examiner

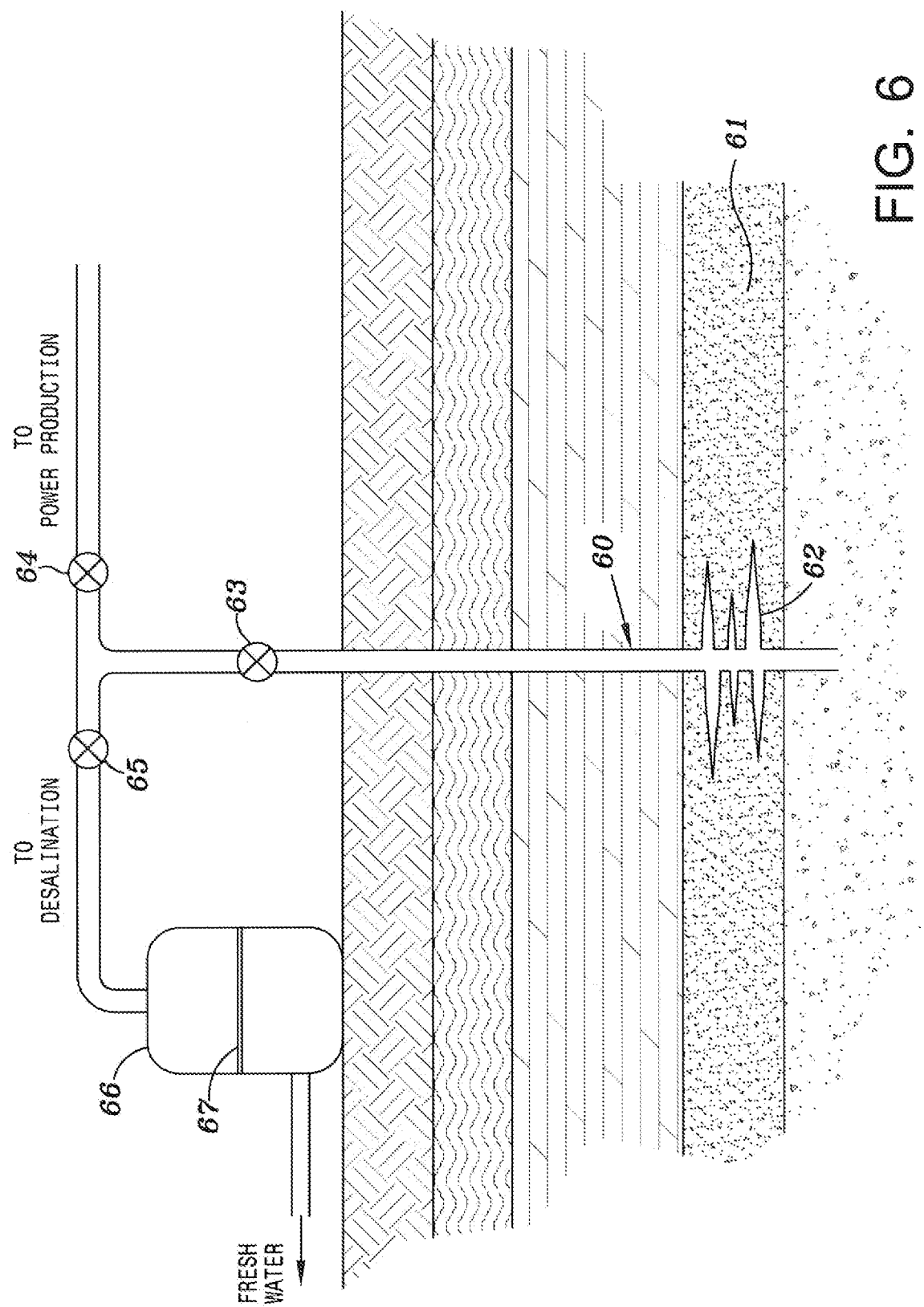

HYDRAULIC GEOFRACTURE ENERGY STORAGE SYSTEM WITH DESALINIZATION

BACKGROUND OF INVENTION

1. Field of the Invention

This invention relates to energy storage and water desalination. More particularly, fluid is injected down a well to form a hydraulic fracture. Fluid may be pumped into the fracture under pressure and later produced from the fracture under pressure and used to generate power or flow into a reverse osmosis unit for desalination.

2. Discussion of Related Art

A number of factors including energy security, price volatility, carbon regulation, tax incentives and fears of anthropogenic global warming are driving rapid growth of renewable energy sources. Since liquid fossil fuels are consumed primarily in the transportation industry due to their outstanding energy density (about 45 MJ/liter) and biofuels provide only limited energy gain, the key role for renewable energy sources is to displace fossil fuel consumption in electric power generation. The U.S. presently consumes on the order of 1 TW ($10^{12}$ Watts) of electric power, so only renewable technologies that can eventually deliver 100's of GW overall are meaningful grid-scale options. Aside from hydroelectric power, which has been operating at essentially full capacity for decades, only solar- and wind-based systems can be considered at this time. Neither of these is cost-competitive today without substantial publicly-funded subsidies, although capital expenditures and operating costs are expected to drop over time, and may eventually reach price-parity with coal- and gas-fired power plants. Of these, wind-powered turbines are the more economical, with a capital expenditure (capex) of about $1.75/watt, and Texas alone has an installed base with a peak production capacity of roughly 2.5 GW.

These two key renewable resources, wind and solar, suffer from intermittency on both daily and seasonal bases, as illustrated in FIG. 1. Neither is therefore suitable for providing base-load power. Output fluctuations also cause grid instability; without dynamic load-leveling means (e.g. smart grid technologies) renewable power sources must now be limited to less than about ten percent of delivered power on a given electric grid. As a result, renewable electric power at the grid level is limited not only by source economics, but also grid stabilization technologies.

Thus, large scale electric energy storage technology is needed in parallel with renewable energy sources. Table 1 enumerates the characteristics of candidate energy storage technologies. The most common electric storage systems in use today are based on some sort of battery technology; leading candidates include lead-acid, lithium ion and vanadium flow batteries. These are generally useful not only for leveling renewables at the source, but also for peak-shifting and improving reliability at the point of use. As of 2008, installations were being purchased by PG&E for residential areas with a rated capacity of 1 MW supply for 5 hours at a price of $2M USD. These were justified by deferring investment in increased transmission capacity (~⅔) and partly by improved quality of service (~⅓). This provides a useful scale and price-point for considering alternative storage technologies: 5,000 kw-hr capacity, and $400/kw-hr price.

TABLE 1

|  | Energy - related cost ($/kWh) | Power - related cost ($/kW) | Balance of Plant ($/kWh) | Electrolyzer ($/kW) | Compressor ($/scfm) | η, Discharge Efficiency |
|---|---|---|---|---|---|---|
| Lead-acid Batteries (low) | 175 | 200 | 50 | | | 0.85 |
| Lead-acid Batteries (medium) | 225 | 250 | 50 | | | 0.85 |
| Lead-acid Batteries (high) | 250 | 300 | 50 | | | 0.85 |
| Power Quality Batteries | 100 | 250 | 40 | | | 0.85 |
| Advanced Batteries | 245 | 300 | 40 | | | 0.7 |
| Micro-SMES | 72,000 | 300 | 10,000 | | | 0.95 |
| Mid-SMES (HTS projected) | 2000 | 300 | 1500 | | | 0.95 |
| SMES (HTS projected) | 500 | 300 | 100 | | | 0.95 |
| Flywheels (high-speed) | 25,000 | 350 | 1000 | | | 0.93 |
| Flywheels (low-speed) | 300 | 280 | 80 | | | 0.9 |
| Supercapacitors | 82,000 | 300 | 10,000 | | | 0.95 |
| Compressed Air Energy Storage (CAES) | 3 | 425 | 50 | | | 0.79 |
| Compressed Air storage in vessels (CAS) | 50 | 517 | 50 | | | 0.7 |
| Pumped Hydro | 10 | 600 | 2 | | | 0.87 |
| Hydrogen Fuel Cell/Gas Storage (low) | 15 | 500 | 50 | 300 | 112.5 | 0.59 |
| Hydrogen Fuel Cell/Gas Storage (high) | 15 | 1500 | 50 | 600 | 112.5 | 0.59 |
| Fuel Cell/Underground Storage | 1 | 500 | 50 | 300 | 112.5 | 0.59 |
| Hydrogen engine/Gas Storage | 15 | 350 | 40 | 300 | 112.5 | 0.44 |

As an applied example, a wind turbine with a rated capacity of 3 MW and typical utilization factor of 0.3 will generate about 22,000 kw-hr per day. If three battery-based storage units described above were devoted to each wind turbine, the capex would more than double, based on $5.25M for a 3 MW wind turbine installation. Plainly, current battery technology is prohibitively expensive for general grid-scale storage, even with reasonable technical improvements and economies of scale.

Leading technologies for grid-scale electric energy storage include pumped hydro and compressed air energy storage (CAES). Pumped hydro uses off-peak electric power to pump water uphill to a reservoir. This requires ready access to large amounts of water and conveniently situated terrain, both of which are in short supply in the region where wind power density is suitable—the great plains of the central US. This technical approach is certainly proven and reliable, and also enjoys excellent round-trip efficiency of ~87%. Compressed air storage systems depend on availability of abandoned mines or development of deep sub-surface caverns. This is a proven technology that can be sited over about 85% of the continental US and provides reasonable efficiency at ~80%. Since compression and expansion of air generates large temperature changes, CAES plant to deal with this parasitic energy channel is relatively complex and expensive. The chart in FIG. 2 locates various storage technologies in Power-Energy space, and clearly shows that pumped hydro and CAES stand alone in combining high total energy with high power capability.

Another key application for storage technologies lies in peak shifting, or delivering extra power during short periods of extreme demand. This region is denoted 'Distributed Resources' in FIG. 2. Summer afternoon demand peaks related to air conditioning is a prime example. This is simultaneously a period of low productivity for wind turbines, unfortunately. The chart in FIG. 3 shows the estimated capital costs of various candidate technologies for servicing this application.

As noted above, this application is presently getting addressed by a few early adopters like PG&E, based primarily on deferred investment in transmission lines and improved quality of service. Certainly, there is also a marketing advantage based on the "green cachet" of distributed power.

Until such time as pumped hydro and/or CAES are deployed on a massive scale, we note that there is an interesting arbitrage opportunity in storing excess night-time power from wind turbines and reselling it during the peak demand of summer afternoons. Anecdotally, wind farms are said to actually pay grid operators to take their power at night. Wind power specialists, like Green Mountain Energy, sell wind energy at retail for $0.19/kw-hr during the day. Thus, there exists an opportunity to gross roughly $0.20/kw-hr with a twelve hour storage system. This could be quite a profitable enterprise if the storage technology is inexpensive enough. The economics of existing technologies make this a marginal proposition at best in an environment of tight capital markets and demand for high internal rates of return.

In many areas, there is also a shortage of fresh or potable water. One of the prime methods for desalination of water is reverse osmosis. This process requires pressure to overcome the osmotic pressure of salty water and force the water through a semi-permeable membrane. Thus, additional opportunities exist for combining storage technology and desalination technology.

BRIEF SUMMARY OF THE INVENTION

The present invention uses wells to store fluid at high pressure in hydraulic fractures in the earth. The fluid is used in conventional equipment to produce power as the fluid is produced back from the well. The walls of the fracture may be made less permeable and the propagation pressure of the fracture may be increased by injecting a resin, such as epoxy, into the fracture. The storage capabilities, capital requirements and anticipated rates of return that enable a profitable operation for distributed resources and load management, as well as overnight arbitrage of wind power, are described. If the stored fluid is saline water, such as water produced from strata in the earth, and there is demand for fresh water, a selected fraction of the saline water produced from the storage capacity may be directed to a reverse osmosis unit for desalination.

BRIEF DESCRIPTION OF THE DRAWINGS

FIG. 6 illustrates a hydraulic fracture in the earth around a well and equipment on the earth's surface for controlling flowback from the fracture and generating power or desalinating water.

DETAILED DESCRIPTION OF THE INVENTION

Figure 4:
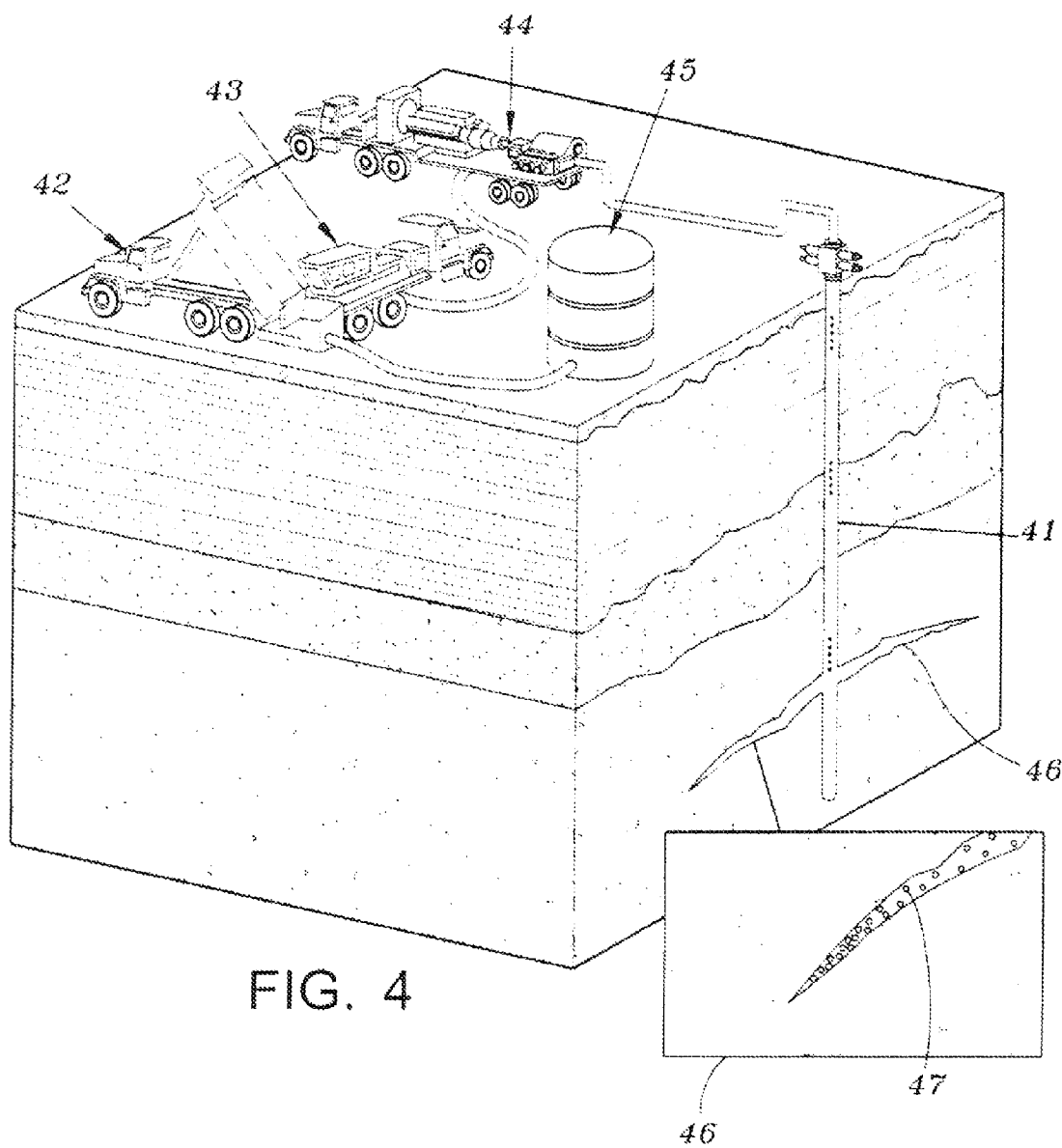
FIG. 4 illustrates a hydraulic fracture in the earth and equipment for forming it.

Hydraulic fracturing is used routinely to improve production rates from oil and gas wells drilled into low permeability reservoirs. Such fractures increase the effective productive surface area of wells into reservoir rock. Indeed, profitable exploitation of unconventional reservoirs, e.g. the Barnett Shale and Bakken Formation, can only be achieved through extensive fracturing. Briefly, after the well casing is cemented in place, perforations are created at the stratum of interest, and then a fluid is pumped down the well at high pressure to induce fractures in the rock formation around the well, as illustrated in FIG. 4. Well 41 has been drilled into a subsurface formation. Sand truck 42 may bring proppant to the well site. Fracturing fluid can be mixed and stored in tank 45, from which it is drawn to blender truck 43, where it is mixed with sand or other proppant. High-pressure pumps 44 are used to force fluid down well 41 at a pressure sufficient to form fracture 46 around the well. Proppant particles 47 may be pumped into the fracture after it has formed. The requisite pressure to form fracture 46 generally depends linearly on depth; a typical 'fracture gradient' is about 0.8 PSI per foot of well depth. So a 3,000 foot well requires a pressure of about 2,400 psi at the rock face to create a hydraulic fracture. In shallow wells (up to 1,000 to 2,000 feet deep), hydraulic fractures normally propagate horizontally. At greater depths, natural stresses in the rock tend to lead to vertically oriented fractures. For our purpose of energy storage, the orientation of the fractures is not important. In any case, energy is stored by deformation of rock around the fracture, which is primarily elastic deformation. The fracture may be primarily in one plane extending from the well through surrounding rock formation, as shown in FIG. 4, or, in naturally fractured rock such as the Barnett or Bakken shale formations, the fracture may extend over a large volume, with many different fluid paths.

A fracture in a well might extend radially from the wellbore, for example, on the order of 100 meters to 1000 meters. If the fracture is primarily in one plane, the fracture thickness can be on the order of 0.5-2 cm at the well bore. Crack propagation can be monitored in real time during the fracture operation using microseismic methods, while the degree and pattern of deformation at the surface of the earth can be measured simultaneously using tiltmeters. The fluid permeability and elastic properties of the fractured rock stratum effectively determine the extent of fracture possible with a given pumping system. As the fracture increases in length, the surface area of rock increases along with the rate of fluids entering the rock rather than filling the fracture proper. Thus, highly permeable rocks can be difficult to fracture at all, while less permeable rocks can be fractured to greater distances. Fluid loss additives (particles) may be added to the fracture fluid to decrease the rate of fluids entering the rock from the fracture. Fluid loss can be further decreased by pumping a polymer resin in the fracturing fluid. Preferably, an aliphatic epoxy resin may be used, such as described in the paper "Water-Dispersible Resin System for Wellbore Stabilization," L. Eoff et al, SPE 64980, 2001. Furan, phenolic and other epoxy resins may also be used. The resin system can be pumped as a neat resin, a resin/sand mixture, or dispersed in water- or oil-based fracturing fluid. The resin may be mixed with a diluent or solvent, which may be reactive. A slug of neat resin at the beginning of a fracture resin may be followed by a dispersion of resin in fracturing fluid and this followed with fracturing fluid. Proppant and/or fluid loss agents may be added to either of the fluids. Volumes of the different fluids are preferably selected to allow epoxy or other resin to fill the fracture to the tip and infiltrate the rock around the fracture tip. Injection of resin or resin-containing fluids may be applied repeatedly to obtain lower fluid loss from a fracture.

Figure 5A:
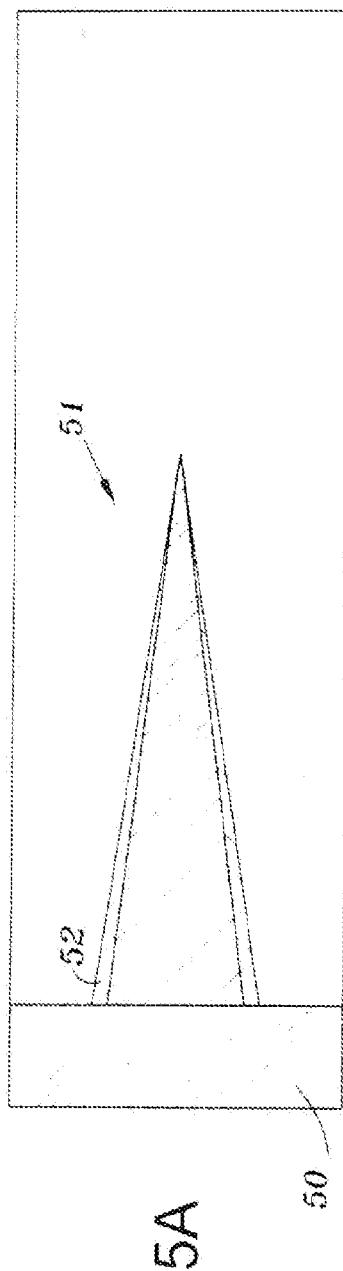
FIG. 5A is a cross-section of a fracture showing resin leak-off into rock surrounding a fracture.
Figure 5B:
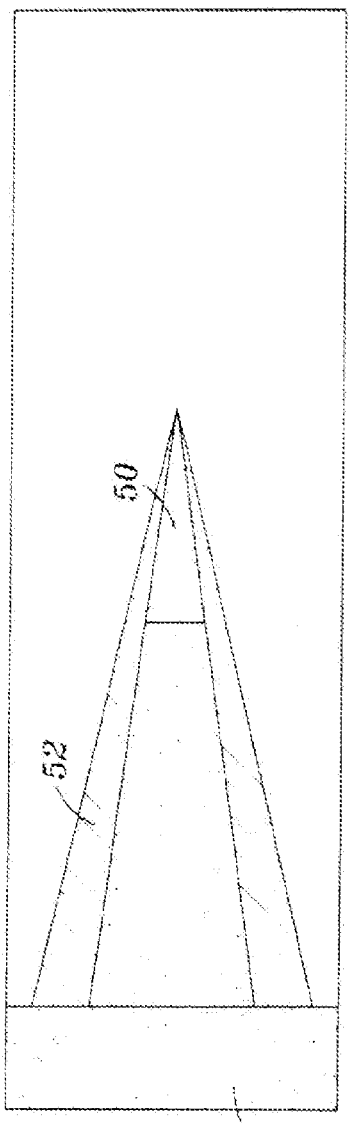
FIG. 5B shows resin at the end of the fracture.
Figure 5C:
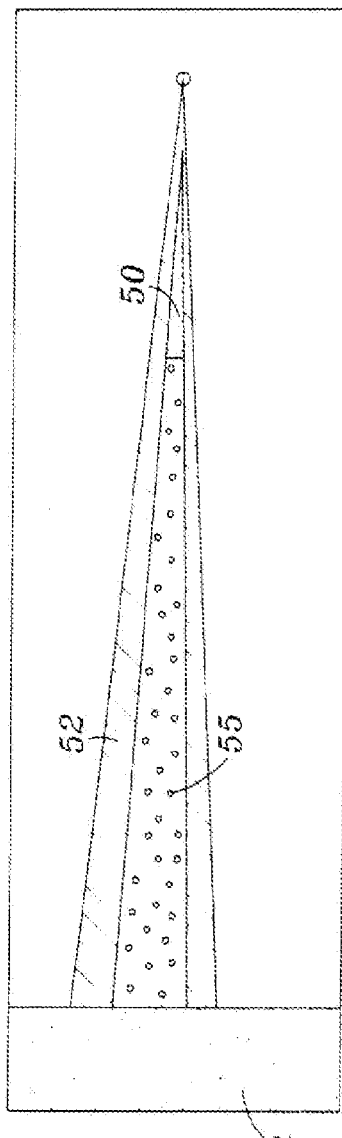
FIG. 5C shows proppant in the fracture.

FIGS. 5A, 5B and 5C illustrate, by showing cross-sections of a fracture, one method of placing a resin in a fracture to prepare the fracture for storage of energy, as taught herein. In FIG. 5A, a resin, dispersion of resin or liquid mixture with resin 50 is present in a wellbore and in fracture 51 that has been formed in rock. Resin 50 may contain a fluid loss additive. Resin-leaked-off- into-rock 52 surrounds the fracture. In FIG. 5B, displacement fluid 54, which may be water containing a viscosifier, oil-based or containing a solvent for the resin, is shown moving resin 50 toward the end of the fracture. Displacement fluid 54 preferably is more viscous than resin 50. The amount of resin-leaked-off-into-rock 52 has increased. In FIG. 5C only a limited amount of resin 50 remains in the fracture, and it is present near the tip or end of the fracture. Fracture 51 may contain proppant 55.

After curing, the resin in or around the tip of the fracture will increase the propagation pressure of the fracture and allow wider fractures to be created during fluid storage. Fluid leak-off rate of fluid to be stored under pressure in the fracture can be decreased to a small or minimal value. With the achievement of low fluid loss from a fracture, gas may also be used as the working fluid for the storage process, alone or with liquid.

For the purposes of energy storage, we are interested in large fractures with little fluid loss. Ideally the fluid loss will be zero, and so suitable rock strata may be completely impermeable. We note that additives used to reduce or eliminate fluid loss from a fracture during fracturing would be useful in this application to reduce or eliminate fluid loss in slightly permeable rock strata. Materials useful for reducing fluid invasion include polymers, fine silica, clays, possibly new nanostructured materials like graphene suspensions and mixtures of selected materials. Any fluid injected into the fracture may contain a proppant or it may not contain a proppant.

Under these conditions we note that the energy used to generate the fracture can be partitioned into three main categories: fluid friction (lost, depends on pumping rates and pipe sizes in the well), cracking rock (small; lost), and elastic flexure of rock surrounding the fracture. Importantly, we note that the energy used to deform the rock elastically is actually stored as potential energy. This energy can be recovered from the fluid stream ejected from the fracture and borehole as the rock relaxes to its original position. Thus, after a large fracture is formed, the fluid filled space can be used to hydraulically lift (and flex) overburden and store mechanical energy. That energy can be efficiently recovered by allowing the pressurized fluid to escape through a turbine. The process of injecting fluids at a pressure above the fracture gradient may be repeated a selected number of times, alternately with the process of producing fluid back to generate power. Thus the fracture functions as an elastic storage vessel. Overall, this scheme is conceptually similar to pumped hydro systems. Instead of pumping water alone uphill, however, we will pump water down, and use it to hydraulically lift and flex a large dense block of earth or deform the earth elastically. The key components (pumps, turbines) and loss channels (fluid friction) are similar or common to both, so we expect that this new approach will have about the same overall efficiency as pumped hydro, at about 87% on a round trip basis.

A key advantage of this new approach is that flat terrain can be used, and massive earthworks and environmental impacts are eliminated.

We show below a pair of example fracture installations to demonstrate the scale of energy storage available by this new approach assuming that the rock deformation or lifting that occurs around a hydraulic fracture can be represented by the following:

EXAMPLE 1

1 Km Deep Well, With 1 Cm Average Lift Over 100 Meter Radius (Typical Oilfield Frac)

| | | |
|---|---|---|
| Well depth: | 1,000 m | |
| Fracture radius: | 100 m | |
| Slug volume: | 31,400,000 m³ | |
| Rock density: | 2,800 kg/m³ | |
| Slug mass: | 87,900,000,000 kg | |
| Slug weight: | 862,000,000,000 Newtons | |
| Average lift: | 1 cm | |
| Lift energy: | 8,620,000,000 Joules | 8.6 E 9 Joules |
| Storage capacity: | 2,395 kw-hr | |

EXAMPLE 2

1 Km Deep Well, With 10 Cm Average Lift Over 500 Meter Radius

| | |
|---|---|
| Well depth: | 1,000 m |
| Fracture radius: | 500 m |
| Slug volume: | 7.85 E 8 m³ |
| Rock density: | 2,800 kg/m³ |
| Slug mass: | 2.20 E 12 kg |
| Slug weight: | 2.16 E 13 Newtons |
| Average lift: | 10 cm |
| Lift energy: | 2.16 E 12 Joule |
| Storage capacity: | 5.99 E 5 kw-hr |

Although explanations of hydraulic fracture properties are described, Applicant does not wish to be bound by a particular scientific theory concerning the properties of hydraulic fractures.

Figure 1:
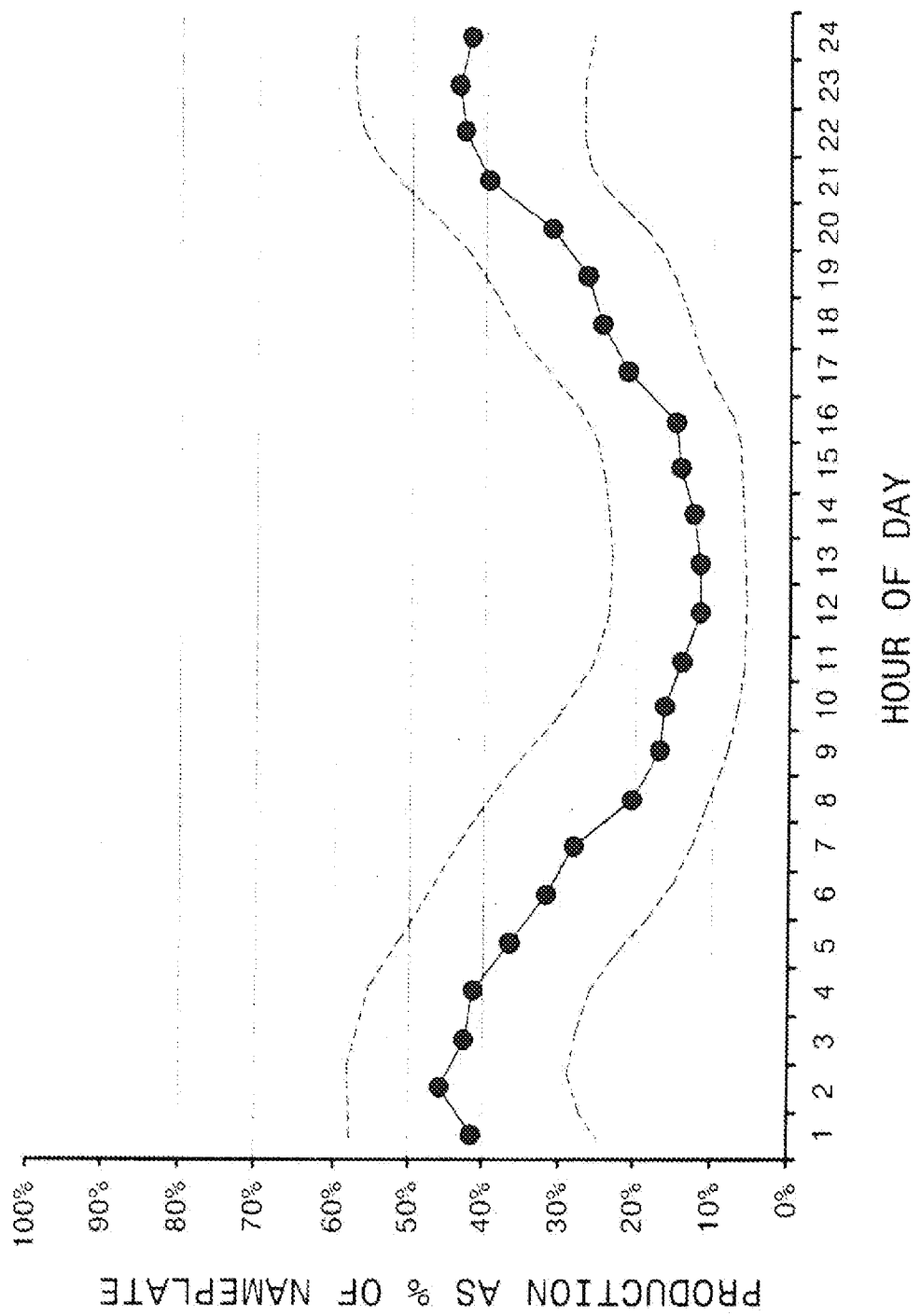
FIG. 1 shows the diurnal wind pattern at Wildorado, Tex.
Figure 2:
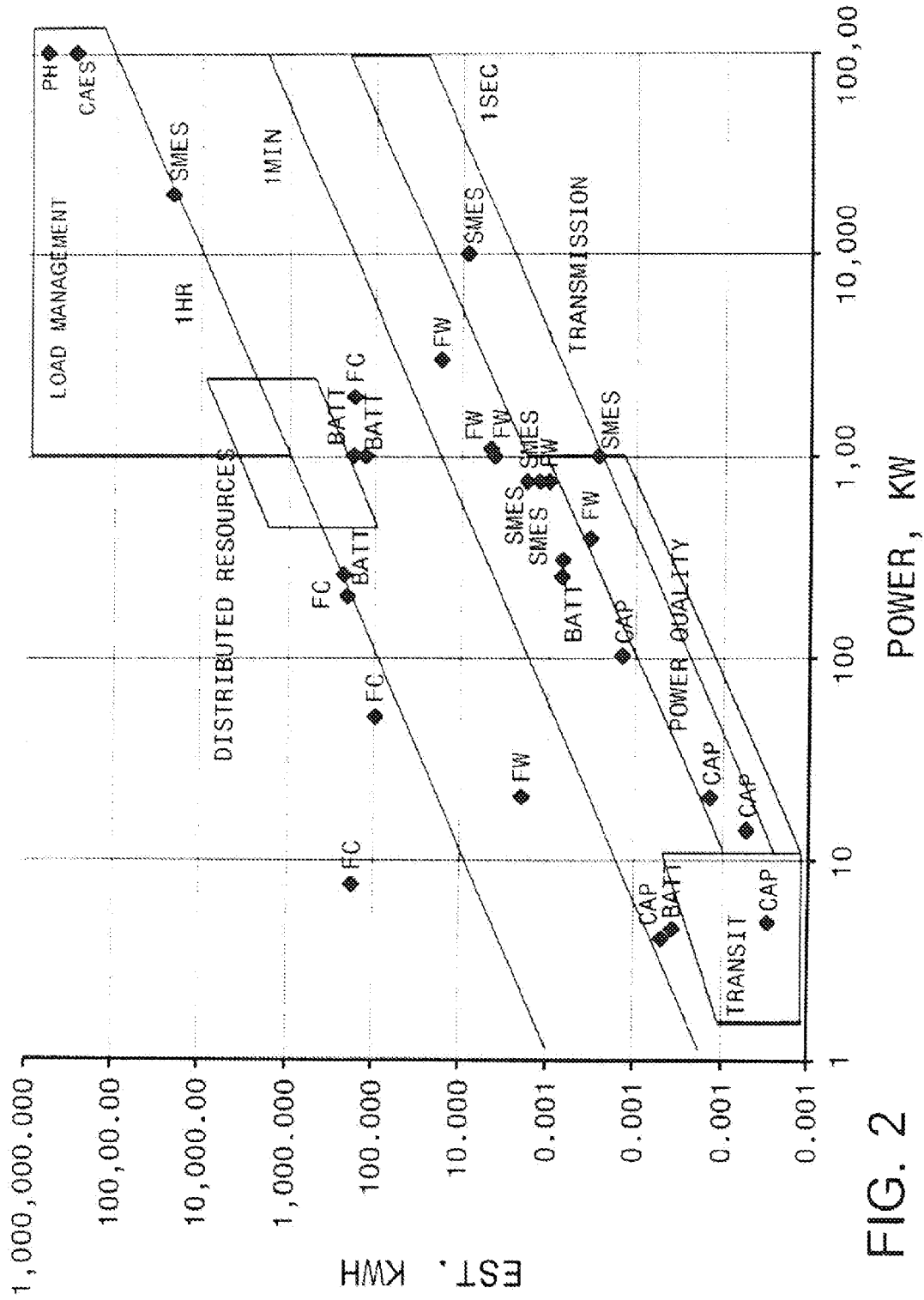
FIG. 2 shows energy storage technologies costs and efficiencies.
Figure 3:
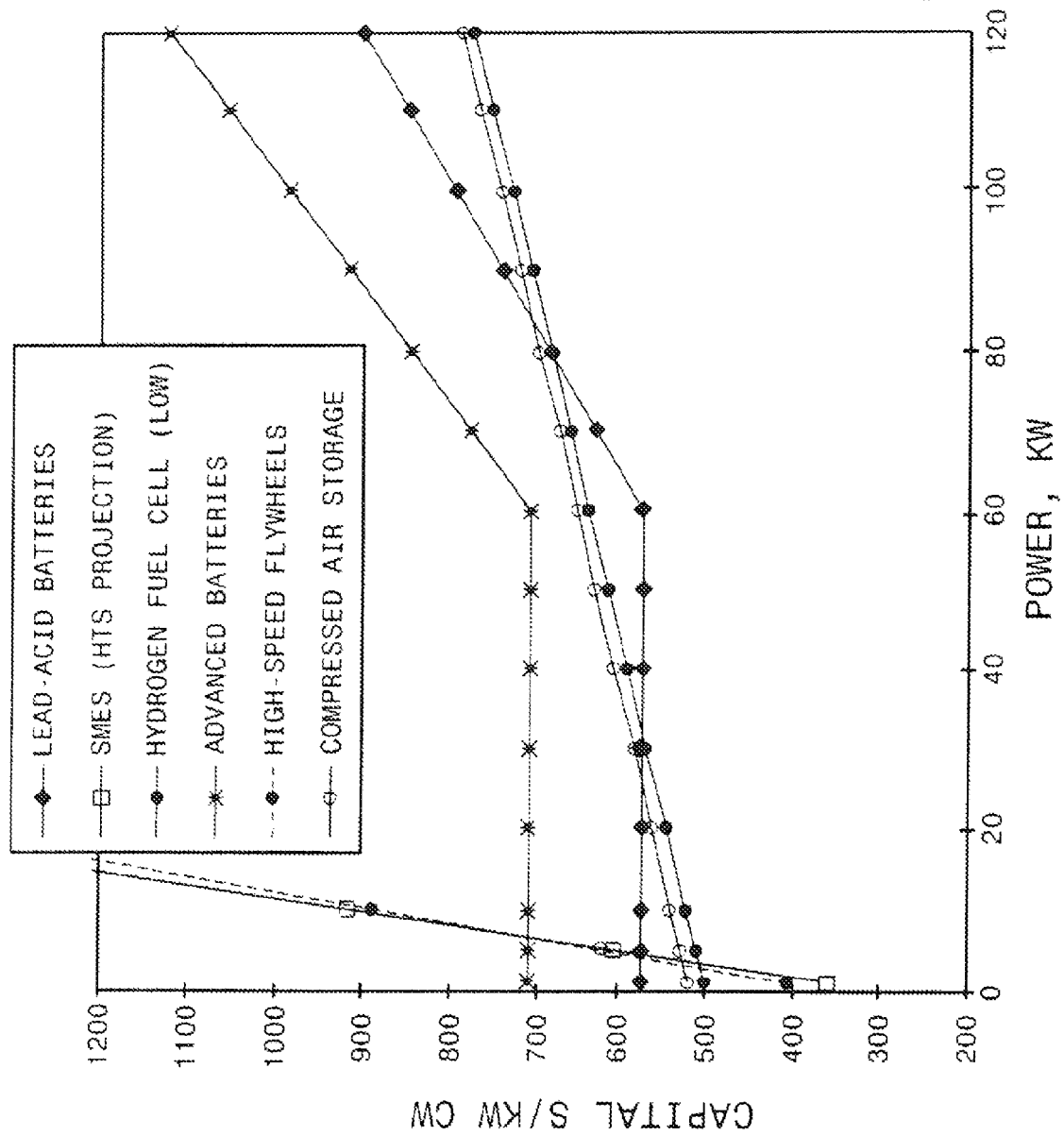
FIG. 3 shows distributed utility applications and renewables matching.

For comparison, a 3 MW wind turbine operating at typical 30% utilization factor generates 2.16E4 kw-hr per day. The unit described in example 2 can therefore store the entire nominal daily output of wind farm comprised of 167 turbines. If one purchased a battery based storage system for this amount of stored energy at current prices ($400/kw-hr), a capital investment of roughly $239 Million would be required. We expect that the capital investment for energy storage in such hydraulic fractures would be roughly three to ten times less. The scale of energy storage is plainly in the load management regime (FIG. 2), which is presently only accessible by pumped hydro and CAES technology. If the system in this example were cycled at 30% of capacity each day, the arbitrage value would be approximately $18,000 per day at $0.10 per kw-hr.

The fluid injected into a fracture may be liquid or gas. A suitable fluid is brine produced from a strata in the earth below the potable water equifers. The brine may be produced along with hydrocarbon production. If brine or water containing dissolved salt is injected into the fracture of FIG. 4 or 5, the fluid produced back will be essentially of the same composition as the fluid injected. The pressure of the produced fluid will be at an elevated level until the fracture closes. The excess pressure may be used to produce power, as disclosed above, or the excess pressure may be used to desalinate a portion of the produced water or all the produced water, as illustrated in FIG. 6.

Referring to FIG. 6, well 60 has been drilled and hydraulic fracture or fractures 62 have been formed in the well. Leakoff from the fracture has been limited, as discussed above. Tubulars have been placed in the well and valve 63 installed to control flow in or out of the well. The well may then be connected to valve 64 for controlling flow to power generation facilities, as discussed above, during a flowback phase. The well may also be connected to desalination or other water-treatment facilities through valve 65. A preferred water-treatment facility is a reverse osmosis unit, such as unit 66. Using elevated pressure of fluid flowing back from well 60, semi-permeable membrane 67 allows removal of dissolved salt from water and production of fresh water, as shown in the figure. Valves 64 and 65 may both be opened during a flowback phase of stored water at elevated pressure, allowing both production of power and production of desalinated water. Alternately, either one of valves 64 and 65 may be closed and all produced fluid be used for one purpose, such as desalination. Alternatively, either valve may also be varied in opening or closing during a flowback phase. Variation of the opening of the valves in response to variation in pressure of the produced fluid during a flowback phase may improve results of the combined processes of power generation and desalination.

Depending on the salinity of the water being treated, reverse osmosis will typically require anywhere from 200-1200 psi of differential pressure across a semi-permeable membrane. This is typically the range of driving force that is required to overcome the osmotic pressure and cause water to flow through the semi-permeable membrane. Typical flow rates are 15-35 gal/ft$^2$/day (GFD) for seawater, depending on the process conditions.

A range of water content may be used—from very low salinity (small amounts of TDS coming out of a stratum during normal operation), to moderate salinity (using brackish groundwater or water produced along with hydrocarbon as the injectate), to elevated salinities (high salinity process water). Reverse osmosis can be used to both control the water quality of the storage facility during normal operation, i.e., remove dissolved solids that may affect the performance of the reservoir, for example, causing scale build-up in the well and/or inside the fractures, as well as a method for converting non-potable sources of water to potable quality (e.g. "pumped hydro desalination"). Devices well-known in reverse osmosis processes, such as pressure exchanger energy recovery devices (available from Energy Recovery, Inc.) may be used. This provides a way to integrate energy storage and water treatment/desalination. If no power is produced during flowback, the process can be viewed as essentially converting stored energy directly into useful work by desalting water.

The water injected into fractures has been described and having dissolved salt, but fresh water (having no dissolved salts) may also be used as a working fluid. The pressure of fresh water flowing back from a fracture can then be exchanged to water to be desalinated such that the saline water can then be desalinated using reverse osmosis. Pressure exchangers such as described above may be used for this purpose.

Although the present invention has been described with respect to specific details, it is not intended that such details should be regarded as limitations on the scope of the invention, except to the extent that they are included in the accompanying claims.

We claim:

1. A method for storing and producing energy and desalinating water, comprising:
   pumping water containing a dissolved salt down a well at a pressure greater than fracturing pressure and into a hydraulic fracture in a rock formation around the well;
   before leak-off of the water containing a dissolved salt from the hydraulic fracture, reducing pressure in the well so as to produce a portion of the water containing a dissolved salt up the well as produced water and using pressure of a first portion of the produced water to generate power and using pressure of a second portion of the produced water to desalinate the second portion of the produced water.

2. The method of claim 1 wherein the first portion and the second portion of the produced water are varied as produced water is produced up the well.

3. A method for operating an electric grid system, comprising:
   generating electrical power during optimum production periods using a primary source of power for the electric grid system;
   using a portion of the electrical power generated during optimum production periods to pump water containing a dissolved salt at a pressure greater than the fracturing pressure into a hydraulic fracture in the earth;
   during a non-optimum production period, producing the water containing a dissolved salt from the hydraulic fracture and using the pressure of a first portion of the water containing a dissolved salt to generate electrical power for the electric grid system; and
   using pressure of a second portion of the water containing a dissolved salt to desalinate the second portion of the water containing a dissolved salt.

4. A method for desalinating water, comprising:
   pumping water containing a dissolved salt down a well at a pressure greater than fracturing pressure and into a hydraulic fracture in a rock formation around the well;
   before leak-off of the water containing a dissolved salt from the hydraulic fracture, reducing pressure in the well so as to produce the water containing a dissolved salt up the well as produced water and using pressure of the produced water to desalinate the produced water.

5. A method for desalinating water, comprising:
   pumping fresh water down a well at a pressure greater than fracturing pressure and into a hydraulic fracture in a rock formation around the well;
   before leak-off of the fresh water from the hydraulic fracture, reducing pressure in the well so as to produce the water up the well as produced water and using the pressure of the produced water to desalinate water.

6. The method of claim 5 wherein the pressure of the produced water is used to desalinate water by using a pressure exchanger to transfer the pressure of the produced water to a saline water.

* * * * *